May 29, 1945. W. A. ENDTER 2,376,992
LATCH DEVICE
Filed Feb. 28, 1944 7 Sheets-Sheet 1

INVENTOR.
WALDEMAR A. ENDTER,
BY
ATTORNEY.

May 29, 1945.    W. A. ENDTER    2,376,992
LATCH DEVICE
Filed Feb. 28, 1944    7 Sheets-Sheet 5

INVENTOR.
WALDEMAR A. ENDTER,
BY
ATTORNEY.

Fig. 17.

Patented May 29, 1945

2,376,992

UNITED STATES PATENT OFFICE 2,376,992

LATCH DEVICE

Waldemar A. Endter, Long Beach, Calif.

Application February 28, 1944, Serial No. 524,163

23 Claims. (Cl. 292—223)

This invention relates to latch mechanisms of the general type in which a keeper, carried for example by a stationary member and positioned in the path of a movable bolt carried by a closure member, is engageable by the bolt in a latched position thereof, and a take-up force or thrust is exerted by way of the bolt against the keeper to crowd the closure toward and against the stationary member. The particular objects and advances in the art contemplated by the invention can perhaps be explained to better advantage by preliminary reference to certain general structural and operating characteristics of the heretofore known and conventional latch mechanisms of this type.

It has been a customary practice to employ in latch mechanisms a bolt, for example of the rotary type, movements of which in both retractive or anti-latching and in advancing or latching directions, respectively are resisted and caused by a force applied directly to the bolt. For example, a common practice is to apply a spring-urged cam directly against the bolt so that in its initial keeper engaging movement, the bolt displaces the cam against the resistance of its spring, and the spring thereafter urges the cam against the bolt. Accordingly, the extent and efficiency of the take-up action is limited by the degree of mechanical advantage obtainable by the cam action directly against a bolt having no capacity for bodily movement relative to the closure. Another characteristic of such conventional latch mechanisms is that the security with which the latched bolt is assured against accidental release, is dependent upon the ability of the holding or cam means to restrain anti-latching movement of the bolt.

The general object of this invention is to provide a new type of latch mechanism in which the parts have such structural and operating characteristics as to materially improve, over known latch mechanisms, the safety and security of the bolt engagement with the keeper, the facility with which the bolt is engageable to latched position in the keeper, and the effectiveness and range of the take-up action in crowding the latched members together. In accordance with the invention, I employ the general combination of a bodily movable keeper-engaging bolt and a take-up mechanism associated with the bolt and with a part of the latch structure movable relative to the bolt, in a manner such that in the latched position of the bolt, the take-up mechanism acts to advance the closure member in a closing direction away from the bolt. In distinction with the conventional practice, the take-up action occurs by virtue of bodily relative movement between the bolt and closure and the exertion of opposing thrusts against the two. As will later appear, the bolt and keeper are brought into such inter-engaging relationship as to preclude the possibility, even though the take-up mechanism should fail in its intended function, of accidental or inadvertent movement of the bolt from an initial latched position beyond which the take-up action occurs.

A further object of the invention is to provide a take-up mechanism in which the keeper engaging thrust is imparted to the bolt through the intermediary of a relatively movable member to which the take-up force is applied, as by means of a spring-urged cam. Preferably, though typically in the broad aspects of the invention, such cam-urged member may serve also as a carrier for the bolt. A specific object, applying to the herein illustrative form of the invention, is to employ a pivotally mounted bolt carrier member which is pivotally connected to the bolt so that the bolt is capable of relative and independent latching and anti-latching movement but is adapted to be crowded against the keeper by force tending to rotate the carrier member. Such force preferably is applied by a spring-urged cam, which also may conveniently be mounted on the carrier member so as to engage a stationary part of the latch structure.

An additional object is to provide, in conjunction with the bolt and take-up mechanism, means precluding the possibility of interference with free movement of the bolt to a fully latched position, by the take-up mechanism. This object is achieved by means operating automatically in accordance with and by virtue of certain movements of the bolt, to hold the take-up mechanism ineffective to resist latching projection of the bolt, but releasing the take-up mechanism when the bolt has reached a latched position from which it cannot be withdrawn except under control of the operator parts.

The invention has numerous additional features and objects, such as improved bolt and cam releasing means, control mechanisms and locking devices. All these, however, as well as the features and objects referred to in the foregoing, will be understood and appreciated from the following detailed description of the typical and illustrative embodiments of the invention shown in the accompanying drawings, and in which:

Figure 1:
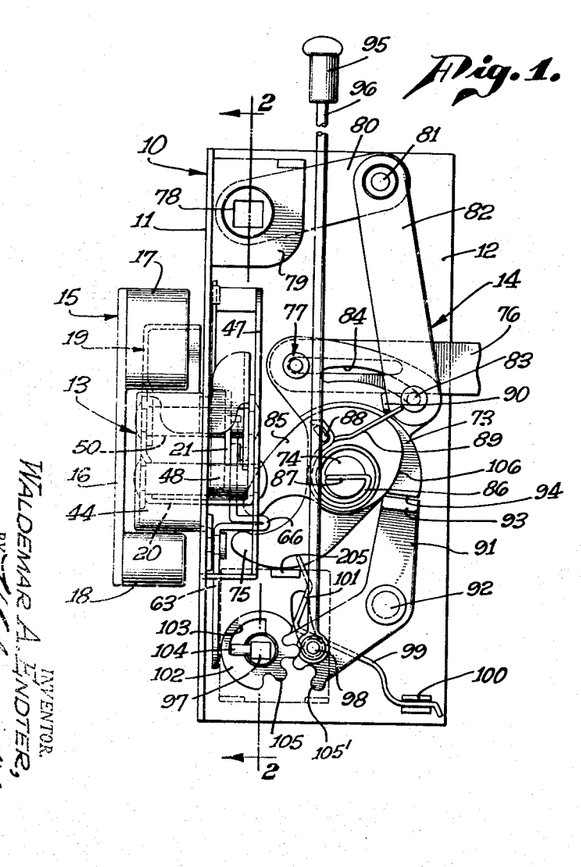
Fig. 1 is an elevation at the inside of the case, showing the bolt and cam releasing mechanism in locked condition.
Figure 2:
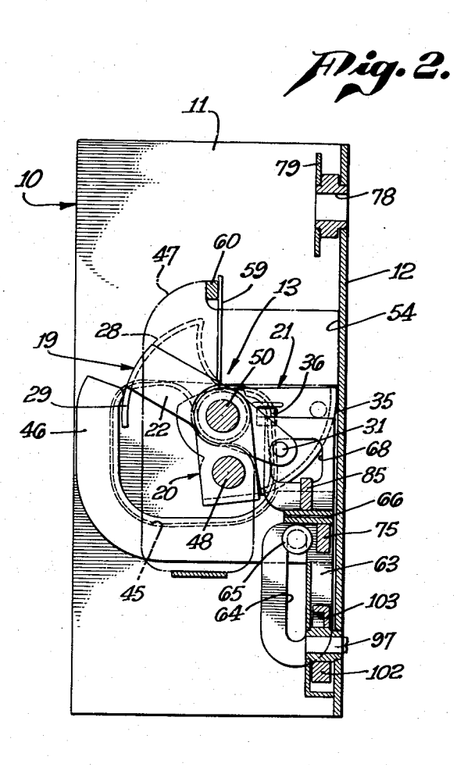
Fig. 2 is a section on line 2—2 of Fig. 1.

Referring first to Figs. 1 and 2, the latch mechanism may be described generally as comprising a case structure 10 having right angle sections or flange portions 11 and 12 carrying respectively the bolt and cam assembly 13, and the operating mechanism 14 for retracting the bolt and cam from latched relation to the keeper 15. As will be understood, the case-carried parts and the keeper 15 are applicable individually to either of a pair of relatively movable members, for example, a door or other closure into which the case assembly is fitted in the usual manner, and a stationary member or pillar to which the keeper 15 is affixed. It may be mentioned that the present mechanism is particularly adaptable to the latching and locking of automobile doors, and exceptionally so by reason of various particularities of the typical form herein illustrated, but it is to be understood that in its broad aspects, the utility of the invention extends to various uses for which latch mechanisms commonly are employed.

The keeper structure 15 may be of the type comprising a base 16 to be secured in the usual manner to the stationary member or door pillar, and carrying a pair of spaced keeper projections 17 and 18, between which parts of the door-carried mechanism are received to form a dovetail in the latched condition of the mechanism, all as will later appear.

Referring to Fig. 2, the principal parts of the assembly 13 are the pivotally oscillatory bolt 19, the pivoted carrier yoke 20 and the cam device 21 (which it is contemplated may comprise any suitable number of individual cams, one being shown as typical and preferred). An understanding of the structure and operation of the assembly views may be facilitated by a description first of the individual bolt, cam and yoke parts, as particularly illustrated in Figs. 8, 9, and 12 to 15. Depending upon the type and particular purpose of the latch mechanism these parts may take different specific shapes and forms. In an automobile door latch they are preferably shaped in the manner illustrated to better accommodate them to the case structure and to pivotal mountings, and to a desirable interfitting and two-point bearing relationship of the yoke and bolt.

Figure 8:
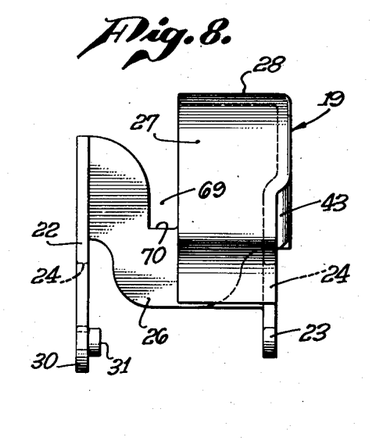
Figs. 8 and 9 are side and end elevations, respectively, of the bolt.
Figure 9:
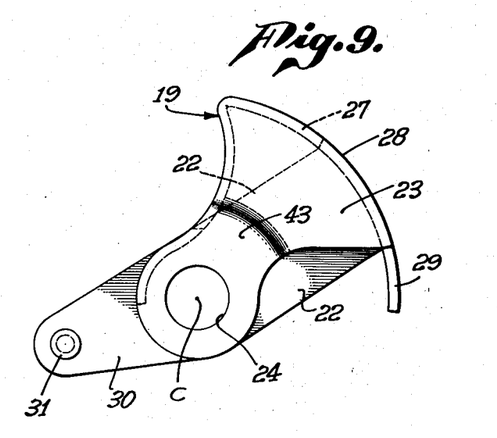

In Figs. 8 and 9, the bolt 19 is shown to comprise spaced end portions 22 and 23 having axially alined openings 24 and interconnected by a bridge piece 26 offset from the openings. A hollow flange portion 27, integral with 23 and 26, has an outer surface 28 of arcuate curvature about the axial center C of the openings 24, the flange 27 having an extension 29 projecting beyond the edge of the end portion 23, as shown in Fig. 9. Portion 22 has an integral extension arm 30 carrying a projection 31 engageable by the later described slide member to retract the bolt.

Figure 12:
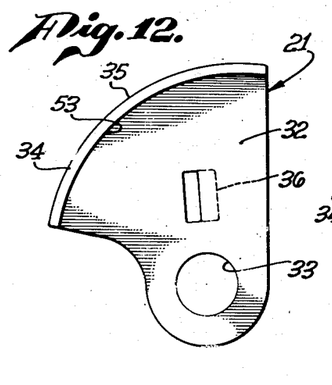
Figs. 12 and 13 are side and edge views, respectively, of the cam.
Figure 13:
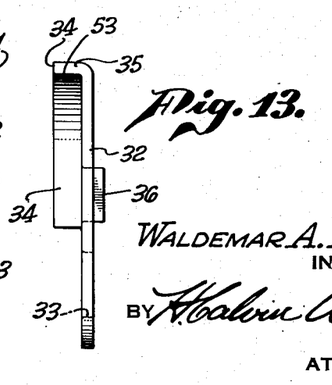

The cam 21, see Figs. 12 and 13, comprises a plate 32 having a shaft receiving opening 33 and a flanged edge portion 34, the outer surface 35 of which has smooth curvature at an increasing radius clockwise about the opening 33, as viewed in Fig. 12. The cam also carries a punched-out lug 36, the purpose of which will later appear.

Figure 14:
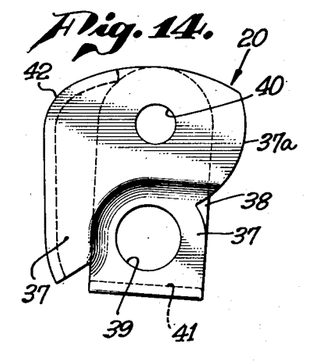
Figs. 14 and 15 are end and side views, respectively, of the yoke.
Figure 15:
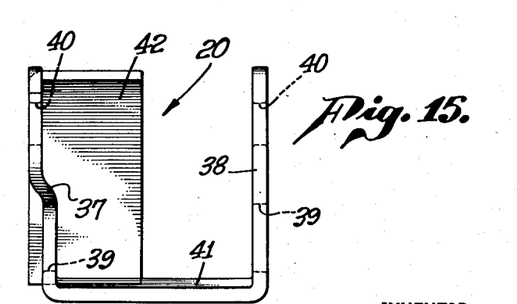

As illustrated in Figs. 14 and 15, the yoke 20 has spaced end portions 37 and 38 with axially alined openings 39 and 40 to receive the later described pins or shafts. The end portions 37 and 38 are interconnected by a bridge piece 41 underlying the openings 39. Portion 37 carries a flange 42 which forms a companionate closure section with the later described outer housing or bracket 44. The circularly curved portion 37a of the end part 37 is adapted to be received within the end recess 43 of the bolt, see Fig. 8, bringing the corresponding end portions of the yoke and bolt into interfitted relation, as they appear in Fig. 4.

Figure 3:
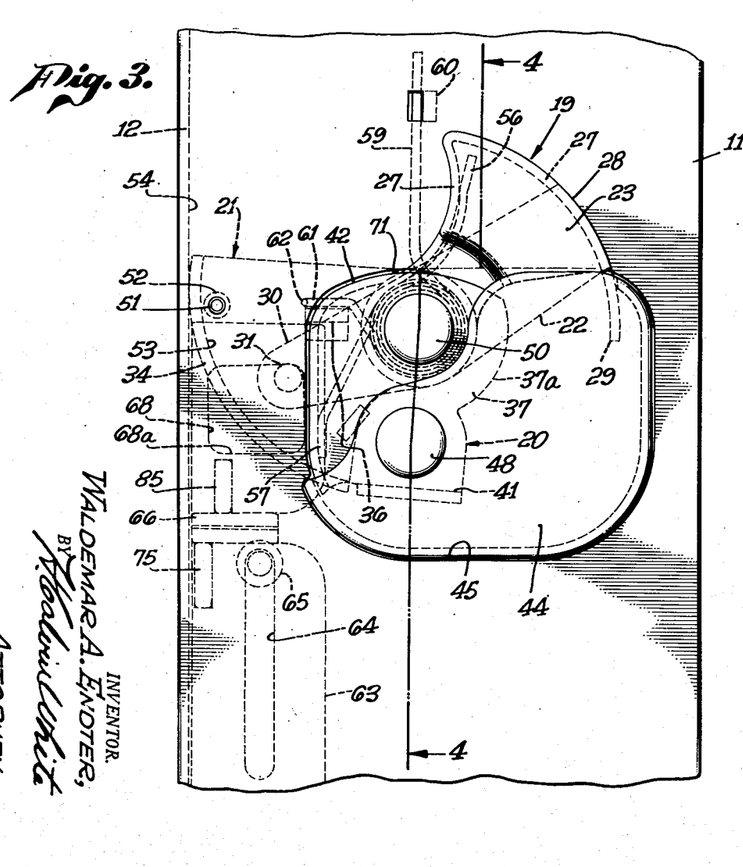
Fig. 3 is an enlarged fragmentary elevation at the bolt side of the case.
Figure 4:
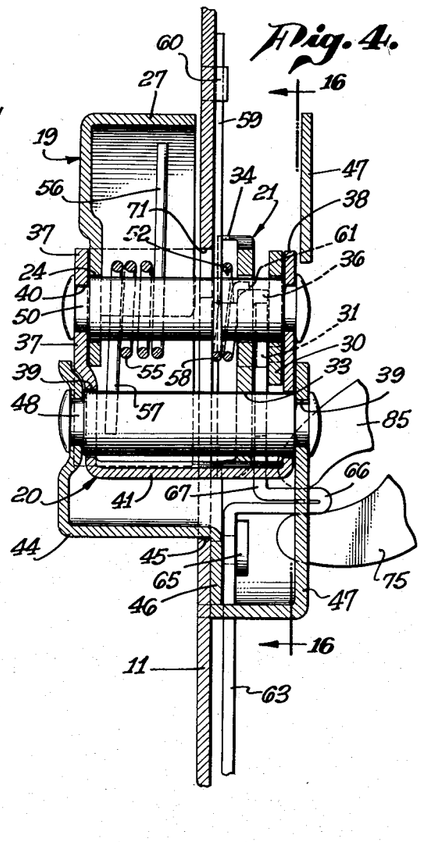
Fig. 4 is a cross-section on line 4—4 of Fig. 3.

Referring now to Figs. 3 and 4, the case section 11 carries an outwardly projecting semi-housing or bracket 44 which is inserted from the inside of the case through an opening 45, the inside flange portion 46 of the bracket being welded or otherwise secured to the case. Also at its inside, the case section 11 carries a deck 47, the shape of which is shown by the dot-dash lines in Figs. 16 and 17. The yoke 20 is pivotally mounted on a stationary shaft 48 extending through the yoke openings 39 and terminating in the bracket 44 and deck 47. The cam 21 is positioned inside the case, with shaft 50 extending through its opening 33 and the cam flange 34 turned toward the case section 11. The bolt 19 is pivotally carried by a pin 50 extending through the bolt openings 24 and terminating in the end portions 37 and 38 of the yoke 20. Thus the bolt is pivotally connected to and carried by the yoke; and the cam, bolt and yoke assembly is pivotally movable on the shaft 48.

As the drawings illustrate, the flange portion 27 of the bolt forms a closure companionate with the open top portion of the bracket 44 at one side thereof, and the yoke flange 42 similarly forms a closure between the bolt and the opposite top and side portions of the bracket. As illustrated in Fig. 3, the case section 11 contains a pin 51 carrying a head or roller 52 engageable with and guiding the inner face 53 of the cam flange 34. Referring to Fig. 2, the curved surface 35 of the cam engages a stationary portion of the case structure, as for example the inner surface 54 of section 12. Thus rotation of the cam in opposite directions along the case surface 54, produces oscillatory movement of pin 50 and the yoke 20 about shaft 48. Such movement also is imparted to the bolt 19, but by reason of its pivotal mounting on the pin 50, the bolt is capable of independent oscillation.

Figure 6:
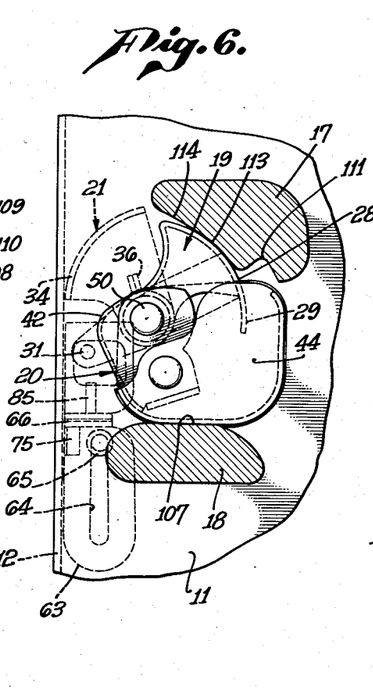
Figure 7:
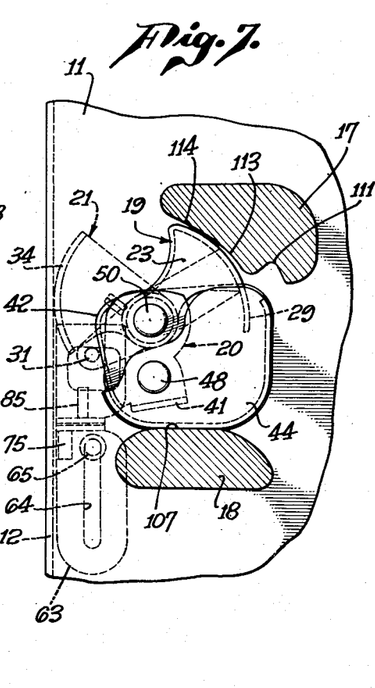

From Figs. 6 and 7 it will be seen that the positions of shaft 48 and pin 50 are such with relation to the interengaging bolt and keeper surfaces, that advancing or counter-clockwise rotation of the cam tends to thrust the bolt more tightly against the keeper and to create an opposing thrust crowding the door against the usual cushion carried by the pillar.

The bolt 19 is thrust to its projected position and in the path of the keeper, and is yieldably restrained against anti-latching rotation relative to the yoke 20, by suitable spring means, shown typically as a coil spring 55 carried about the pin 50 with the ends 56 and 57 of the spring bearing respectively against the flanged portions 27 and 42 of the bolt and yoke. Releasing rotation of the cam 21 about pin 50 is independently resisted by a second coil spring 58 carried about the pin between the cam and the case section 11, see Fig. 4, one end 59 of the spring bearing against the stationary abutment 60 and the opposite end 61 bearing against the cam, as by insertion within an opening 62 therein, see Fig. 3. Showings of the springs have been omitted in Figs. 5, 6, and 7 in order to clarify and simplify the views.

Figure 10:
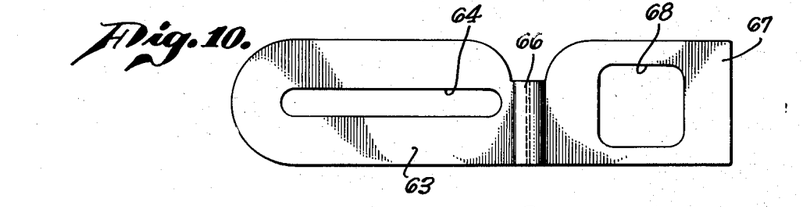
Figs. 10 and 11 are plan and edge views, respectively, of the retracting slide.
Figure 11:
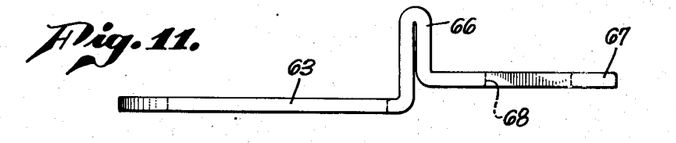
Figure 16:
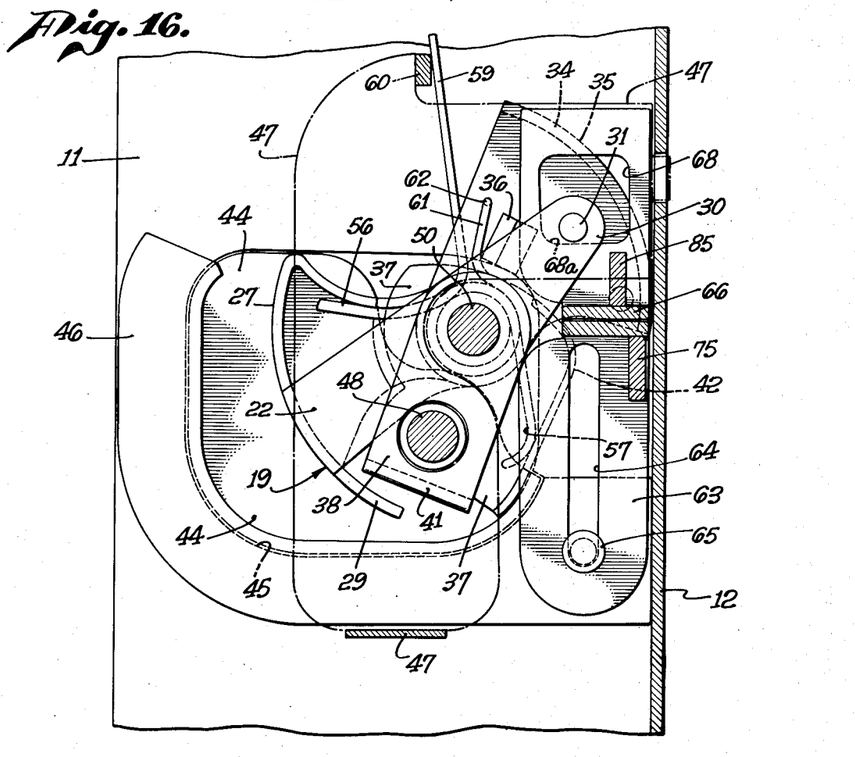
Fig. 16 is a fragmentary enlarged view on line 16—16 of Fig. 4, with the bolt in retracted position to permit its insertion through the case opening.
Figure 17:
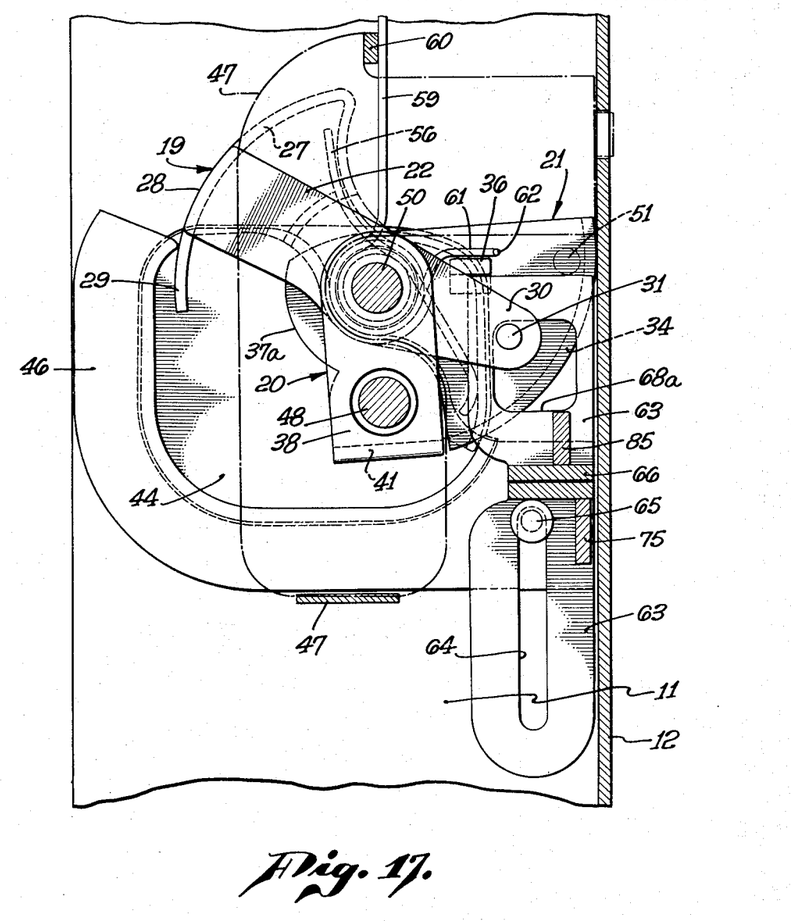
Fig. 17 is a view similar to Fig. 16 showing the bolt in its projected or keeper-engaging position.

The bolt 19 and cam 21 are movable from their projected or advanced positions shown in Fig. 3, to the retracted positions appearing in Fig. 16, by a longitudinally reciprocable slide link 63 paralleling the inside of the case section 11 and containing an elongated slot 64 receiving the stationary guide pin 65. As shown in Figs. 10 and 11, the intermediate portion of the slide link is doubled upon itself to form a projection 66 engageable by the later described actuating parts. The offset end portion 67 beyond the projection 66 contains an opening 68 which receives the projection 31 carried by the arm portion 30 of the bolt to form a lost motion connection between the slide link and the bolt. As shown in Figs. 2 and 17, upon upward movement of the slide link, its top end is engageable against the cam lug 36 to rotate the cam in a releasing direction. During the first interval of such link movement, the bolt remains unaffected by reason of the lost motion connection provided by the slot 68 and projection 31, but upon displacement of the cam to substantially its released position, the lower edge 68a of the slot engages the projection 31 to swing the bolt about pin 50 in an anti-latching direction.

At this point, reference may be had to the method of applying the initially assembled bracket 44, deck 47, slide link 63 and all parts carried by the shaft 48 and pin 50, to the case section 11 and within the bracket opening 45. By positioning the assembly at the inside of the opening and shifting link 63 upward to bring the bolt to the fully retracted position of Fig. 16, the bolt and bracket assembly may be inserted through the opening 45 to the position at which flange 46 and the deck 47 may be rigidly secured to the case. Upward swinging of the bolt to its projected position then is permitted by the case section 11 above the bracket opening being received within the bolt space 69, see Fig. 8, upward swinging of the bolt being limited by the engagement of shoulder 70 against the edge 71 of the bracket opening, see Fig. 4.

The general function of the operating mechanism 14 is to control the slide link 63 in a manner permitting manual release of the cam and bolt from the inside or outside of the door, and permitting also locking of the operator parts at either the inside or outside of the door. The main slide link actuating lever 73 pivoted on pin 74 has an arm portion 75 engageable against the under side of the slide link projection 66, see Fig. 1. The usual inside handle controlled link 76 has a pin and slot connection at 77 with the upper portion of the lever 73, so that movement of link 76 to the right swings the lever to raise the slide link 63. When otherwise actuated in a corresponding direction, the lever 73 is independently movable relative to link 76, by virtue of the lost motion, pin and slot connection at 77.

The outside operator comprises the usual spindle socket 78 rotatable within the case-carried bracket plate 79, the socket having an integral arm 80 pivotally connected at 81 with link 82 which in turn has a lost motion connection with the lever 73 by way of pin 83 received within an arcuate slot 84 in the lever. Downward swinging movement of the arm 80 is transmitted through link 82 to the lever 73, causing its arm 75 to elevate the slide link 63. The outside operator is unaffected by movement of the lever by link 76 in the manner explained, by reason of the lost motion, pin and slot connection 83, 84 between link 82 and the lever.

The slide link 63 normally is maintained in its lower or bolt and cam releasing position, by an arm 85 pivotally carried on pin 74 and yieldably restrained against upward swinging movement by a spring 86 received at 87 within a slot in the pin and bearing at its opposite end against a lug 88 carried by the arm. A second spring 89, similarly carried by the pin 74, bears against a lug 90 on the link 82 to resist swinging thereof in a cam and bolt releasing direction.

A locking element 91 pivotally carried by pin 92 is adapted to be swung into the path of the lever 73, as in Fig. 1 wherein the end 93 of the locking element is shown to be brought opposite a shoulder 94 on the lever, to block the latter against latch releasing by either the inside or outside operators. The locking element 91 normally is swung clockwise from the position illustrated and out of the path of the shoulder 94. The element may be swung into locking relation with the lever by downward movement of the push button 95 and its rod 96 at the inside of the door, or by turning of the key controlled spindle 97 at the outside of the door.

The push button rod 96 is pivotally connected at 98 with the locking element and the latter is releasably held in its locked position by a spring 99 supported at 100 by bearing against a projecting end of the pivot 98 at the inside of the element. Upon release from locking position by elevation of the rod 96, the element 91 is held in its released position by engagement of the angular portion 101 of the spring against the pivot 98. The end portion of the spring is shown to be engageable against a stationary stop 205.

The key controlled spindle 97 is keyed to a flange 102 containing an arcuate recess 103, the ends of which are engageable by the spindle-carried lug 104. The flange 102 also provides a gear segment comprising teeth 105 inter-meshing with teeth 105' on the end of the locking element 91. As will be apparent, rotation of the spindle 97 in either direction engages lug 104 against the ends of the recess 103 to swing element 91 in a releasing or locking direction, as the case may be. Also it will be understood that the push button rod 96 and the key controlled spindle 97 are independently operable to control the position of the locking element 91.

As previously indicated, and as will later more fully appear, movement of the bolt 19 against the keeper 17 as the door swings from open to closed and latched position, causes the slide 63 to shift upwardly, say to a position approaching that in Fig. 16, and to move the cam in a releasing direction. It is desirable that in the event the latch mechanism happens to be locked in the open position of the door, the locking element be releasable as an incident to closing movement of the door, and specifically by virtue of displacement of the bolt upon its engagement against the keeper. For this purpose the arm 85 is provided with a curved cam surface 106 which, as the arm swings clockwise and the slide link 63 is raised, engages and cams the upper end of the locking element 91 to swing the latter to its released position.

Figure 5:
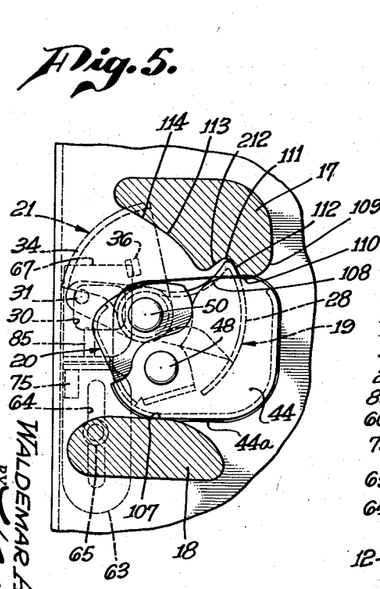
Figs. 5, 6 and 7 are views taken to illustrate the progressive positions of the bolt, yoke and cam as the bolt is advanced to fully latched position between the keepers.

In considering the operation of the mechanisms, first assume the door to be in open position with the bolt disengaged from the keeper and the parts to be positioned substantially as in Fig. 5 except that the bolt is projected upwardly under the influence of spring 56 to a position limited by the engagement of the bolt shoulder 70 against the edge 71 of the case opening 45. The bracket 44 first enters between the keepers 17 and 18 and in close proximity to the bearing surface 107 of the latter, and the curved surface 108 of the bolt engages against the end surface 109 of the keeper 17, causing the bolt to become deflected or cammed downwardly to a position clearing the lower edge 110 of the keeper. The bolt then snaps upwardly into a safety catch position in which the bolt is received within the keeper recess 111 having a surface 112 curved in accordance with the curvature of the outer face 28 of the bolt. As will be apparent, the bolt is securely maintained in this safety catch position against accidental release by any outward pressure or vibration applied to the bolt. Upon further closing movement of the door and latch parts, the bolt is cammed downwardly by engagement with the keeper surface 212, during which movement projection 31 on the bolt arm 30 elevates the slide link a distance sufficient to cause the link, by virtue of engagement or blocking association with the cam lug 36, to prevent downward swinging of the cam under the influence of spring 58. Thus it is important to observe that when the bolt reaches the position at which it can swing into the latched condition of Fig. 6, the latching location of the bolt is unopposed by the cam thrust that is later brought into play for purposes of the take-up. Thus upon riding past the lower extent of the keeper surface 212, the bolt is free to snap into the position of Fig. 6. Another feature of importance is the fact that by virtue of the corresponding curved configuration of the bolt and keeper surfaces 28 and 113, the bolt must necessarily project fully to its Fig. 6 position, thereby obviating the condition frequently encountered in other latch mechanisms, of the bolt only partially entering its latched position and to a limited degree from which the bolt is liable to become accidentally dislodged and released from the keeper. After the bolt assumes the position of Fig. 6, the slide link 63 automatically is shifted downward and away from the cam lug 36 by the thrust of arm 85, thus freeing the cam for action in effecting the take-up.

The purpose and function of the cam 21 is to provide a multiple component take-up acting to forcibly and tightly urge the door in a further closing direction beyond the position of Fig. 6, and to press the bottom surface 44a of the housing tightly against the bearing surface 107 of the lower keeper projection 18. When the bolt has entered the keeper to the position of Fig. 6, spring 58 acts to urge the cam downwardly or in a counter-clockwise direction to a degree permitted by any slackness in the door and pillar cushion engagement, bringing the cam for example to the position shown in Fig. 7. The effect of the cam rotation is to exert by way of pin 50 a thrust tending to swing the carrier 37 about the stationary pivot 48, and to crowd the bolt against the keeper. In this take-up action of the cam, the bolt has a rocking motion against the keeper, bringing the bolt face 28 into engagement with a straight surface 114 directly beyond its curved surface 113. Thus the cam causes opposing thrusts to be exerted against the case 10 (and therefore the door) and the keeper 17, and also opposing thrusts to be exerted by the bolt and case 44 against the keeper surfaces 114 and 107 by virtue of the toggle relationship between the pivots 48, 50 and the point of engagement of the bolt against its keeper.

The latch may be released by actuation of the lever arm 75 to lift the slide link 63, by either the inside or outside operators, all as previously explained. Referring to Fig. 17, and assuming the bolt 19 and cam 21 to be in their fully latched positions, upon upward displacement, the slide link 63 first engages the cam lug 36 to retract the cam in advance of and to permit easy retraction of the bolt. By the time the link shoulder 68a is raised to a position of engagement with the bolt carried projection 31, the cam will have become retracted to permit continued upward movement of the link to swing the bolt downward about pin 50 to the position of Fig. 16. When the door is opened and the operator released, arm 85 returns the bolt and slide link to their normal positions of Fig. 17.

Figure 18:
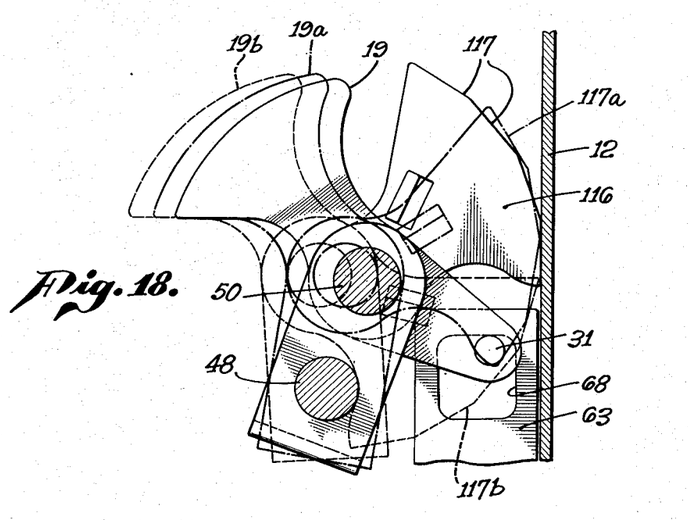
Fig. 18 is a fragmentary view showing a variational form of cam.

Fig. 18 illustrates a variational form of cam characterized by its having self-locking characteristics in relation to its engagement with the case surface against which it bears. For simplicity of illustration, the view is made essentially diagrammatic, showing only the bolt and cam, their mounting, and their relation to the slide link and bearing surface of the case. Here the cam 116 is shown to have successive straight bearing surfaces 117 engageable against the case section 12 and of substantially equal angular extent. The surfaces 117 extend at progressively increasing radial distances about and counter-clockwise of the pivot 50. As the cam is spring-thrust downward, in the manner previously explained, to the dotted line position 117a, the bolt 19 assumes the dotted position 19a, and when the cam is further advanced to the dash line position 117b, the bolt is thrust further to the dash line position 19b. As will be apparent, by virtue of its bearing surface configuration, the cam functions both as a camming element and a holding dog to lock the bolt and associated parts against retractive movement from the positions assumed by the cam when in flat engagement with the case surface.

Figure 19:
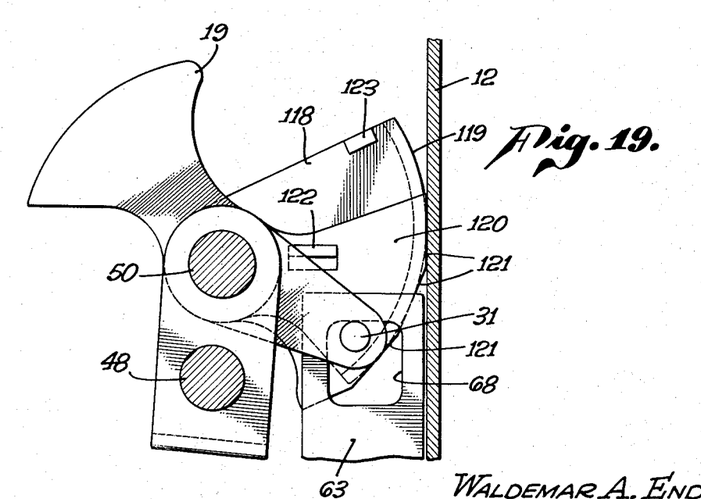
Fig. 19 is a similar view illustrating a further variational form of cam mechanism.

Fig. 19 similarly illustrates the use of a cam and dogging or holding element in combination. Here the cam 118 corresponds in shape and operation to the cam 21 in the first described form of the invention, the cam having a curved surface 119 engageable with the case section 12. The locking dog 120 may comprise a plate-like element pivoted on the pin 50 alongside the cam and having successive flat bearing surfaces 121 corresponding to the bearing surfaces 117 on the cam in Fig. 18. The cam and locking dog may be urged against the case 11 by any suitable spring means, not shown. If for any reason retractive movement of the cam 118 should occur, maintenance of the bolt 19 in the furthest projected position to which it may have become advanced by the cam, is assured by the engagement of the locking dog 120 against the case surface. The locking dog and cam are sequentially releasable from bearing engagement with the case by upward movement of the slide link 63, whereupon the link first engages lug 122 on the locking dog and swings the latter to a position of engagement against lug 123 on the cam so that in the final movement of the slide link, the locking dog and cam are retracted together.

While in the foregoing consideration of the different forms of the invention I have referred to the use of spring means for actuating the cam, and to cam locking means as shown in Figs. 18 and 19, it will be understood that the security of the latch effected by the bolt is independent of the cam spring, locking means, or in fact of the cam itself. That is to say, when the bolt is projected to the position of Fig. 6, its security against retraction is independent of the cam parts. The latter are responsible for the take-up but impose no limitation on the security of the latch.

I claim:

1. A latching mechanism applicable to a stationary member and a swinging closure member, comprising a keeper to be carried by one of said members, a keeper-engaging bolt to be carried by the other of said members and bodily movable relative thereto, and means operable to hold the bolt against the keeper and at the same time to swing the closure member toward said stationary member and with relation to the keeper and the bolt.

2. A latching mechanism applicable to a stationary member and a movable closure member, comprising a keeper to be carried by one of said members, a movable bolt to be carried by the other of said members and engageable with the keeper, and means exerting opposing thrusts against the bolt and closure member to hold the bolt against the keeper and at the same time to bodily move the closure member toward said stationary member and with relation to the keeper and the bolt.

3. A latching mechanism applicable to a stationary member and a swinging closure member, comprising a keeper to be carried by one of said members, a keeper-engaging bolt to be carried by the other of said members and bodily movable relative thereto, and spring-urged cam means operable to hold the bolt against the keeper and at the same time to swing the closure member toward said stationary member and with relation to the keeper and the bolt.

4. A latching mechanism applicable to a stationary member and a swinging closure member, comprising a keeper to be carried by one of said members, a bolt to be carried by the other of said members and movable to a position of latched engagement with the keeper, the bolt being bodily movable relative to said other member, and means operable to hold the bolt against the keeper and at the same time to swing the closure member with relation to the keeper and bolt toward said stationary member from the position had by the closure at said bolt position of latched engagement with the keeper.

5. A latching mechanism applicable to a stationary member and a swinging closure member, comprising a keeper to be carried by one of said members, a bolt to be carried by the other of said members and bodily movable relative thereto, spring means for projecting the bolt into latched engagement with the keeper, and means operable independently of said spring means to hold the bolt against the keeper and at the same time to swing the closure member toward said stationary member and with relation to the keeper and the bolt.

6. A latching mechanism applicable to a stationary member and a swinging closure member, comprising a keeper to be carried by one of said members, a pivotally movable keeper-engaging bolt to be carried by the other of said members and bodily movable relative thereto, and cam means operable to hold the bolt against the keeper and at the same time to swing the closure member toward said stationary member and with relation to the keeper and the bolt.

7. A latching mechanism applicable to a stationary member and a movable closure member, comprising a keeper to be carried by one of said members, a pivotally and bodily movable bolt to be carried by the other of said members, spring means for projecting the bolt into latched engagement with the keeper, and cam means operable independently of said spring means to hold the bolt against the keeper and at the same time to bodily move the closure toward said stationary member and with relation to the keeper and the bolt.

8. A latch mechanism applicable to a stationary member and a swinging closure member, comprising a keeper to be carried by one of said members, a keeper-engaging bolt to be carried by the other of said members and bodily movable relative thereto, an element movable relative to the bolt and associated therewith so that movement of said element urges the bolt against the keeper, and means applying force to said element to hold the bolt against the keeper and at the same time to swing the closure member toward said stationary member and with relation to the keeper and the bolt.

9. A latch mechanism applicable to a stationary member and a movable closure member, comprising a keeper to be carried by one of said members, a movable bolt to be carried by the other of said members and engageable with the keeper, an element pivotally connected to the bolt and associated therewith so that movement of said element urges the bolt against the keeper, and spring-urged cam means applying force to said element to hold the bolt against the keeper and at the same time to bodily move the closure member toward said stationary member and with relation to the keeper and the bolt.

10. A latch mechanism applicable to a stationary member and a movable closure member, comprising a keeper to be carried by one of said members, a movable bolt to be carried by the other of said members and engageable with the keeper, an oscillatory element movable pivotally relative to the bolt to urge the bolt against the keeper, and cam means movable with said element and applying force thereto to hold the bolt against the keeper and at the same time to bodily move the closure member toward said stationary member and with relation to the keeper and bolt.

11. A latching mechanism applicable to a stationary member and a movable closure member, comprising a keeper to be carried by one of said members, a movable bolt mounting carried by the other of said members, a bolt carried by said mounting and engageable with the keeper, a spring for projecting said bolt in the path of the keeper, and cam means for actuating said mounting while the bolt engages the keeper, said cam means acting independently of said spring to urge and hold the bolt against the keeper while the spring holds the bolt against anti-latching movement relative to the keeper.

12. A latching mechanism applicable to a stationary member and a movable closure member, comprising a keeper to be carried by one of said members, a pivotally movable bolt actuating element, a spring projected bolt initially movable against the keeper and then into latched engagement therewith, and means for exerting against said element a force tending to urge the bolt against the keeper independently of said spring, said element being pivotally movable in one direction by virtue of engagement of the bolt with the keeper during an initial closing movement of said closure member, and being urged by said means to move pivotally in an opposite direction when the bolt moves into latched engagement with the keeper upon continued closing movement of said closure member.

13. A latch mechanism comprising a keeper, a bolt actuating element, a bolt movable to a position of latched engagement with the keeper, yielding means maintaining the bolt in the path of the keeper, and cam means for actuating said element independently of said yielding means to force the bolt against the keeper in the latched position of the bolt.

14. A latching mechanism applicable to a stationary member and a movable closure member, comprising a keeper-engaging bolt carried by said closure member, means forming a bearing shoulder on said closure, a keeper structure comprising a first abutment adapted to bear against said shoulder and to block movement thereof in one direction, a second keeper abutment spaced from and in opposing relation to said first abutment, said second abutment being adapted to block movement of the bolt in a closure opening direction, a spring acting to project the bolt into the path of said second abutment, and cam means exerting opposing forces against the closure member and bolt to hold the bolt against said second abutment while engaging said shoulder with said first abutment and to bodily move said closure relative to the bolt and said second abutment.

15. A latching mechanism applicable to a stationary member and a swinging closure member, comprising a keeper to be carried by one of said members, a keeper-engaging bolt to be carried by the other of said members and bodily movable relative thereto, means operable to hold the bolt in latched engagement against the keeper and at the same time to swing the closure member toward said stationary member and with relation to the keeper and the bolt, and means operable to release said holding means and to then release the bolt from latched engagement with the keeper.

16. A latching mechanism applicable to a stationary member and a swinging closure member, comprising a keeper to be carried by one of said members, a keeper-engaging bolt to be carried by the other of said members and bodily movable relative thereto, said bolt being movable in a retracting direction by engagement with the keeper and then being movable to a projected or latched position, means operable to thrust the bolt against the keeper in said latched position and at the same time to swing the closure member toward said stationary member and with relation to the keeper and the bolt, and a releasing member operable to release said bolt thrusting means when the bolt is in latched engagement with the keeper and to then release the bolt from the keeper.

17. A latch mechanism comprising a case, a bolt engageable with a keeper, a member movable relative to the bolt and associated therewith so that movement of said member moves the bolt in latching relation with the keeper, means associated with said case and forming a stationary bearing surface, and a spring-urged cam engageable with said surface and operable to actuate said member to move the bolt in said latching relation with the keeper.

18. A latch mechanism comprising a case, a pivotally movable bolt engageable with a keeper, a movable member supporting the bolt for bodily movement thereof, said member being movable relative to the bolt to move the bolt in latching relation with the keeper, means pivotally supporting said member, means associated with said case and forming a stationary bearing surface, and a spring-urged cam pivotally connected to said member and operable to actuate said member to move the bolt in said latching relation with the keeper.

19. A latch mechanism comprising a keeper, a pivotally movable carrier member, a pin carried by said member and having bodily oscillatory movement therewith, a bolt engageable in latched condition with said keeper and pivotally carried by said pin, a cam pivotally carried by said pin, a spring urging said cam to cause movement of said member and advancement of the bolt in a latching direction, and a spring resisting anti-latching rotation of the bolt relative to said member.

20. A latch mechanism comprising a keeper, a pivotally movable carrier member, a pin carried by said member and having bodily oscillatory movement therewith, a bolt engageable in latched condition with said keeper and pivotally carried by said pin, a cam pivotally carried by said pin, a spring urging said cam to cause movement of said member and advancement of the bolt in a latching direction, a spring resisting anti-latching rotation of the bolt relative to said member, and means operable sequentially to release said cam and to retract the bolt from the keeper.

21. A latching mechanism applicable to a stationary member and a swinging closure member, comprising a keeper to be carried by one of said members, a bolt carried by the other of said members and movable to a position of latched engagement with the keeper, the bolt being bodily movable relative to said other member, means operable to hold the bolt against the keeper while in said position and at the same time to swing the closure member toward said stationary member and with relation to the keeper and the bolt, and means rendering said holding means ineffective to resist movement of the bolt at said position out of latched association with the keeper.

22. A latching mechanism applicable to a stationary member and a swinging closure member, comprising a keeper to be carried by one of said members, a bolt carried by the other of said members and movable to a position of latched engagement with the keeper, the bolt being bodily movable relative to said other member, spring-urged cam means operable to hold the bolt against the keeper while in said position and at the same time to swing the closure member toward said stationary member and with relation to the keeper and the bolt, and means operable from the inside or outside of said closure to render said cam means ineffective to resist movement of the bolt at said position out of latched association with the keeper.

23. A latching mechanism applicable to a stationary member and a swinging closure member, comprising a keeper to be carried by one of said members, a bolt to be carried by the other of said members and bodily movable relative thereto, said bolt being movable along the keeper surface into latched relation therewith, and a closure take-up mechanism operable to hold the bolt against the keeper and at the same time to swing the closure member toward said stationary member and with relation to the bolt independently of any appreciable bolt movement along said keeper surface.

WALDEMAR A. ENDTER.